United States Patent [19]

Yukawa et al.

[11] Patent Number: 5,658,508
[45] Date of Patent: Aug. 19, 1997

[54] METHOD FOR CONTINUOUSLY FORMING A SYNTHETIC STONE

[75] Inventors: Nobuhiko Yukawa, Akashi; Katsuhiko Sakamoto; Kozo Nogi, both of Takatsuki; Naofumi Tsujino, Yao, all of Japan

[73] Assignee: Nippon Shokubai Co., Ltd., Osaka, Japan

[21] Appl. No.: 460,935

[22] Filed: Jun. 5, 1995

[30] Foreign Application Priority Data

Jun. 6, 1994 [JP] Japan ................. 6-123890

[51] Int. Cl.⁶ ............................................. B29C 43/30
[52] U.S. Cl. .................. 264/40.4; 264/40.5; 264/73; 264/166; 425/141; 425/371
[58] Field of Search ......................... 425/140, 141, 425/147, 371; 264/40.4, 411, 412, 75, 76, 77, 73, 245, 40.5, 166

[56] References Cited

U.S. PATENT DOCUMENTS

| | | | |
|---|---|---|---|
| 3,574,802 | 4/1971 | Hinds et al. | 425/141 |
| 3,841,811 | 10/1974 | Peille . | |
| 3,880,559 | 4/1975 | Peille . | |
| 5,043,377 | 8/1991 | Nogi et al. . | |
| 5,128,077 | 7/1992 | Stevenson et al. | 264/412 |
| 5,194,189 | 3/1993 | Papastavros et al. | 264/40.4 |
| 5,509,795 | 4/1996 | Near et al. | 264/40.4 |

FOREIGN PATENT DOCUMENTS

| | | | |
|---|---|---|---|
| 56354 | 7/1982 | European Pat. Off. | 264/40.4 |
| 0209609 | 1/1987 | European Pat. Off. . | |
| 47/34815 | 9/1972 | Japan . | |
| 3/51565 | 8/1991 | Japan . | |

OTHER PUBLICATIONS

Database WPI, Derwent Publications, Ltd., AN–95–212088 and Patent Abstracts of Japan, JP–7–124968, May 16, 1995.

Primary Examiner—Mathieu D. Vargot
Attorney, Agent, or Firm—Oblon, Spivak, McClelland, Maier & Neustadt, P.C.

[57] ABSTRACT

Provided is a method for continuously forming a synthetic stone having a thickness with a high degree of accuracy, without using a complicated apparatus, in which resin compound is filled between belt-like upper and lower films in two layers running horizontally on a band-like floor, upstream thereof, so as to continuously form the synthetic stone, a regulating plate 31 is disposed above the band-like floor 3 and downstream of the resin filling part, and the resin compound (R) is continuously filled in a condition in which the gap between the regulating plate and the band-like floor 3 and is set to a predetermined value. Further, the filling volume of the resin compound is adjusted in accordance with a variation in the thickness of the formed resin plate having passed through the regulating plate.

3 Claims, 2 Drawing Sheets

METHOD FOR CONTINUOUSLY FORMING A SYNTHETIC STONE

BACKGROUND OF THE INVENTION

1. Field of the Invention

The present invention relates to a continuously forming method for continuously forming a synthetic stone slab.

2. Description of the Prior Art

Heretofore, an apparatus for manufacturing a panel-like polymerized material by continuously polymerizing polymerizable compounds, has been known, as disclosed in Japanese Patent Publication No. Sho 47-84815 entitled "Continuous Polymerization Method and Apparatus therefor". For example, in an apparatus using metal endless belts as disclosed in the above-mentioned publication, two band-like metal belts which are stretched in an endless manner such as to be horizontally laid in parallel with each other with a predetermined gap therebetween, and which are sealed by gaskets at their opposite widthwise sides, are moved in one and the same direction at one and the same speed while liquid resin is continuously filled into the gap therebetween so as to continuously form a resin sheet. Further, the apparatus as mentioned above incorporates a device for generating a suitable liquid pressure between the surfaces of the metal belts so as to prevent the upper metal belt horizontally running from flexing, in order to obtain a product having an uniform thickness.

However, in the above-mentioned conventional continuous forming method, it is necessary to adjust the height of the column of a liquid material in a filling duct and the degree of depressurization in the upper space in the duct. Accordingly, complicated devices such as a vacuum generating unit and a material feed duct having a height as high as about 5 m should be provided, and in addition, adjustment to the thickness of the product has been difficult.

Another possible forming method excluding the above-mentioned device is such that resin is filled and hardened between two films laid in two layers one over another and horizontally running in parallel with each other, the lower film sliding on a support bed. This method is preferable since it does not require the above-mentioned complicated apparatus including metal belts or the like, and since it can form a sheet-like mold product with the use of a simple arrangement. However, this method has a disadvantage such that it cannot be applied for molding which requires a high degree of accuracy for its thickness.

The reason why such a degree of accuracy cannot be expected, is considered that a volume of a molding material larger than a proper volume of molding material, which is defined as the product of the area of a gap between rollers and the surface of the support bed and a film traveling speed per unit time, is transferred to pass through the gap, even though, for example, the molding material poured into between the films is fed through the rollers, and accordingly, the rollers cannot exhibit a substantial effect upon the control of the thickness. That is, it can be readily understood by taking into a consideration that the flowing speed of the molding material in the gap exceeds the film traveling speed, and accordingly, if the films are adjusted to a shape corresponding to the gap, a difference in pressure applied to the molding pressure occurs between the inlet and the outlet of the rollers.

Namely, on the inlet side of the rollers, the pressure of the molding material stagnating at least above the upper end of the roller gap causes the molding material to pass therethrough at a speed higher than the film travelling speed. Accordingly, the thus obtained thickness of the molding material is directly and greatly influenced by the level of the molding material on the roller inlet side. Further, the upper surface of the molding material humps up exceeding the upper end of the roller gap, due to the above-mentioned reason, just after it passes through the rollers, and finally, the liquid pressure of the molding material balances with a pressure which is given by the tension applied to the films and which is to confine the molding material, so that the molding material comes to be static. Thus, the molding material having passed through the rollers, bulges out in a convex shape in the cross-section as view in the travelling direction. As a result, such a disadvantage has been experienced to that a uniformly flat sheet cannot be obtained.

OBJECT AND SUMMARY OF THE INVENTION

The present invention is devised in view of the problems inherent to the above-mentioned conventional continuous resin sheet forming device, and accordingly, major object of the present invention is to provide a method for continuously forming a synthetic stone, which can enhance the degree of accuracy for the thickness of the formed resin plate, without using a complicated device.

According to the present invention, there is provided a forming method for continuously forming a synthetic stone by filling and thereafter hardening a resin compound between belt-like films laid in two layers one over another and horizontally running, comprising the step of filling the resin compound between the films, passing the resin compound through regulating plate arranged downstream of a part where the resin compound is filled, molding the resin compound into a resin plate while the thickness of the fed-out molding material is maintained to be constant.

The synthetic stone in the present invention includes synthetic stone formed from a mixture of resin such as unsaturated polyester resin or acrylic resin as a base, and a filler such as aluminum hydroxide, glass powder or silica which are used solely or in combination and having a marble-like outward appearance, natural stone-like synthetic stone formed from a mixture of resin as a base, and crushed pieces of natural stone (sandstone or granite) or the like, or synthetic stone formed from a mixture of resin as a base, and resin particles, instead of the above-mentioned crushed pieces of natural stone, which are obtained by crushing a hardened thermoplastic or thermosetting resin material.

In the present invention, it is preferable to provide the step of detecting a level of the filled resin compound so as to adjust the filling volume of the resin compound in order to maintain the detected level at a desired value.

In the present invention, it is preferable to include the steps of detecting a level of the above-mentioned filled resin compound, adjusting the filling volume of the resin compound so as to maintain the detected level at a desired value, detecting a thickness of a molding material having passed through the regulating plate, and correcting the desired value in accordance with a difference between the detected molding thickness and a desired molding thickness.

The regulating plate in the present invention, is adapted to be set so as to increase the resistance of a molding material flow passage in order to reduce the excessive flowing speed of the molding material caused by the molding material stagnating above the upper end of the regulating plate on the regulating plate inlet side. In general, the flowing speed of fluid flowing in a pipe is exhibited by the following expression:

$$FS \propto A \cdot DP/(V \cdot L) \qquad (A)$$

where FS is a flowing speed, A is a cross-sectional area of a pipe, DP is a pressure differential between the inlet and outlet of the pipe, V is a viscosity of the fluid, and L is the length of the pipe.

Accordingly, by applying the above-mentioned relational expression to the regulating plate in the present invention, it is understood that the longer the length of the regulating plate, or the higher the viscosity of the molding material, the lower the flowing speed. In the present invention, since the films and the molding material travel at an equal speed, the flowing speed is given by a speed in excess of the film travelling speed, and accordingly, the smaller the value of the flowing speed, the smaller the influence of variation in the pressure occurring on the inlet side of the regulating plate. Thus, with the use of the forming method according to the present invention in which the molding material is led through the regulating plate, it is possible to sufficiently decrease the influence of variation in pressure on the inlet side upon the plate thickness.

Further, the regulating plate in the present invention are made of a material having a sufficient rigidity so as to press the films holding therebetween the molding material, from the outside thereof, in order to regulate the shape thereof, thereby it is possible to exhibit desired technical effects. It is noted that the material and the surface condition should not be limited to those mentioned above. Should concavities and convexities be present at the outer surface of the molding material or should the cross-sectional shape of the regulating plate vary, an additional flow would be induced in the material. Even in this case, the flowing resistance is ensured for the regulating plate as a whole, and accordingly, such an effect that the degree of influence upon the outlet side plate thickness, caused by variation in the inlet side pressure, is reduced, can be maintained. It is preferable that the regulating plate is formed of flat plate and is arranged so as to make the shapes of the molding material on the inlet side and the outlet sides identical with each other, since the resistance applied to the films by the regulating plate can be decreased so that an accident such as breakage of the films can hardly occur.

According to the present invention, a method of filling a molding material between films running horizontally, may be carried out by use of, for example, a filling nozzle provided between the films, for discharging the molding material. Alternatively, the method is carried out by pouring the molding material onto the belt-like lower film horizontally running, and thereafter, by covering thus poured molding material thereover with an upper film. According the latter mentioned method, the variation in the inlet pressure of the regulating plate can be managed by controlling the level of the molding material to be poured, and this method is therefore preferable since it can be simply carried out. It is noted that the angle of the upper film making contact with the liquid surface of the molding material is desirably set to a sufficiently large value larger than, for example, 30 deg. in order to prevent bubbles form being entrained into the molding material, when the outer surface of the molding material poured by the latter method, is covered with the upper film. Further, the pouring volume of the molding material can be controlled by detecting the level of the molding material just before the upper film makes contact therewith, and then by adjusting the level to be constant.

Specifically, a non-contact type length measuring machine of ultrasonic, laser or capacitance type is used. A contact type length measuring machine using a float or the like is unpreferable since it causes the flow of the molding material to vary. Data concerning the level of the molding material measured by the above-mentioned length measuring machine are input to, for example, a PID control device which controls the opening degree of a solenoid valve equipped in a pouring device so as to maintain the level of the molding material at a desired value, and accordingly, the filling volume or the pouring volume can be controlled.

With the execution of the above-mentioned control, the variation in the inlet side pressure of the regulating plate can be limited within a predetermined range. It is noted that a method for introducing the molding material held between both upper and lower films, into the regulating plate may be carried out by directly introducing the molding material into the regulating plates, or indirectly introducing thereinto after the upper and lower films are once brought into contact with the molding material by use of rollers.

Further, the edge parts (in the direction of the breadth) of the upper and lower films in the present invention, should be appropriately sealed in order to prevent the molding material from flowing away or leaking. Specifically, the edge parts of both upper and lower films can be continuously heat-sealed in the longitudinal direction thereof, or a pair of suitable gaskets are interposed between the upper and lower films, in parallel with each other.

Due to the reasons as mentioned above, with the use of the regulating plate, the degree of influence upon variation in the outlet side plate thickness, caused by variation in the inlet side pressure can be reduced, in comparison with a conventional case in which the plate thickness is regulated only by use of, for example, rollers. However, in an actual forming process, the control of variation in the outlet side plate thickness within a predetermined range would often be insufficient only by using the regulating plate. Because the viscosity as one of the factors in the above-mentioned expression (A) can hardly be maintained at a constant value during a long forming period. This is caused by, for example, variation in temperature, an increase in the viscosity of the material itself or the like.

As mentioned above, as the viscosity increases, the flowing speed in the above-mentioned expression (A) decreases so that the plate thickness of the mold product is decreased. On the contrary, if the viscosity increases, the plate thickness is increased. The influence of random variation in the level of the molding material can be reduced by using the regulating plate. However, the variation in the viscosity thereof inevitably causes the thickness of the mold product to vary even though the level of the molding material is controlled so as to be maintained to be constant on the inlet side. In order to eliminate such detrimental influence, the plate thickness of the mold product or the thickness of the molding material downstream of the regulating plate is always monitored, and if the measured plate thickness is larger, the desired value for the level of the molding material to be controlled on the inlet side is changed to be lower. Meanwhile if the plate thickness is smaller, the desired value should be contrarily changed to be higher.

Specifically, in addition to the control of the level of the molding material in accordance with data concerning the level thereof, the plate thickness of the mold product is measured. Then the measured plate thickness is subjected to numerical calculation, and thereafter the above-mentioned solenoid valve is controlled. In this case, the level of the filled molding material is detected, and accordingly, the filling volume or the pouring volume of the molding material can be adjusted so as to maintain the detected level thereof at a desired value. Further, the thickness of the molding resin downstream of the regulating plate is detected, and accordingly, the desired value can be changed in accordance with a difference between the detected thickness of the mold product and a desired molding thickness. With this control method, it is possible to continuously form a mold product having a uniform thickness even though the viscosity of the molding material varies. It is noted that either a contact type measuring machine or a noncontact type measuring machine can be used for the measurement of the plate thickness after the forming. Further, a contact type one using a displacement guage or the like can be also used.

Further, the regulating plates has to have a length necessary for obtaining a high degree of accuracy for the thickness of the mold product. By dividing both sides of the above-mentioned expression (A) with the width of the mold product so as to set the flowing speed per unit width to the variation in the plate thickness, and by regarding the cross-sectional area of the pipe, the length of the pipe and the pressure differential between the inlet side and the outlet side, respectively, as the gap by the regulating plate, the length of the regulating plate and the range of variation in the level of the molding material on the inlet side, the following expression (B) can be obtained:

$$TV \propto G \cdot RLV/RL \cdot V \quad (B)$$

where TV is the variation in the plate thickness, G is the gap by the regulating plate, RLV is the range of variation in the level of the molding material on the inlet side, RL is the length of the regulating plate, and V is viscosity of the molding product.

As understood from this expression (B), if the viscosity is constant, it is necessary to set the length of the regulating plate to be longer with respect to the gap by the regulating plate in order to reduce influence upon variation in the plate thickness, caused by variation in the level on the inlet side molding material.

Next, in order to obtain a desired shape for the dimensions of the regulating plate, the expression (B) is transformed as follows. At first, the function required for the regulating plate is called as a regulating effect which is expressed by the following expression (1). This expression (1) gives the ratio between variations in the plate thickness on the inlet side and on the outlet side of the regulating plate, and if the variation on the inlet side can be decreased to one-tenth, the regulating effect becomes 10. As to the coefficients of the regulating plate, only the ratio of the length of the regulating plate against the gap by the regulating plate is necessary (refer to expression (2)). The other value, that is, the cross-sectional shape of the opening can be set in accordance with the shape of a product to be formed.

$$RE = LV/ATD \quad (1)$$

$$RC = RL/RG \quad (2)$$

where RE is the regulating effect, LV is the variation in the level of the molding material on the inlet side (control range), ATD is the dimensional tolerance of the plate thickness of a product to be produced, RC is the coefficient of the regulating plate, RL is the length of the regulating plate, and the RG is the gap by the regulating plate.

In the case of setting the above-mentioned expressions (1) and (2), the shape of the regulating plate, that is, the coefficient of the regulating plate can be expressed by the following expression (3), in view of the expression (B):

$$K = RC \cdot V/RE \quad (3)$$

where K is a value which varies in dependence upon various conditions, but which is empirically considered to satisfactorily fall within a range of 100 to 2,000, and V is the viscosity (poise) of the molding material. If K is less than 100, it is not preferable since a sufficient regulating effect cannot be obtained. If K exceeds 2,000, improvement of the regulating effect cannot be found, and further, excessively long regulating plate are required. Accordingly, it is also not preferable since the cost and the man-hours are increased.

In the present invention, the molding material should not be limited to the specific one. However, the molding material having a low viscosity is unpreferable since the regulating plate has to have a long length. On the contrary, if the viscosity of the molding material is excessively high, the effect of the regulating plate becomes less. Further, since the widthwise leveling cannot be sufficiently made so that the formed plate thickness is likely to be uneven, it is not preferable. Thus, the range of the viscosity of the molding material is preferably 5 to 150 poise, and more preferably 20 to 100 poise.

The above, and other objects, features and advantages of the present invention will become apparent from the following description read in conjunction with the accompanying drawings, in which like numerals designate the same elements.

DETAILED DESCRIPTION OF THE PREFERRED EMBODIMENTS

Figure 1:
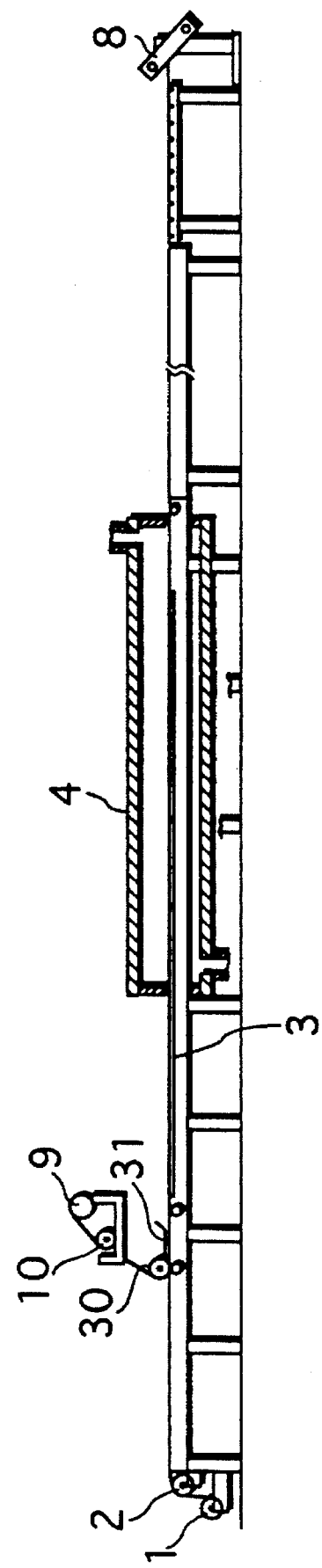
FIG. 1 is a side view illustrating a forming apparatus with which a continuously forming method according to the present invention is carried out.
Figure 2:
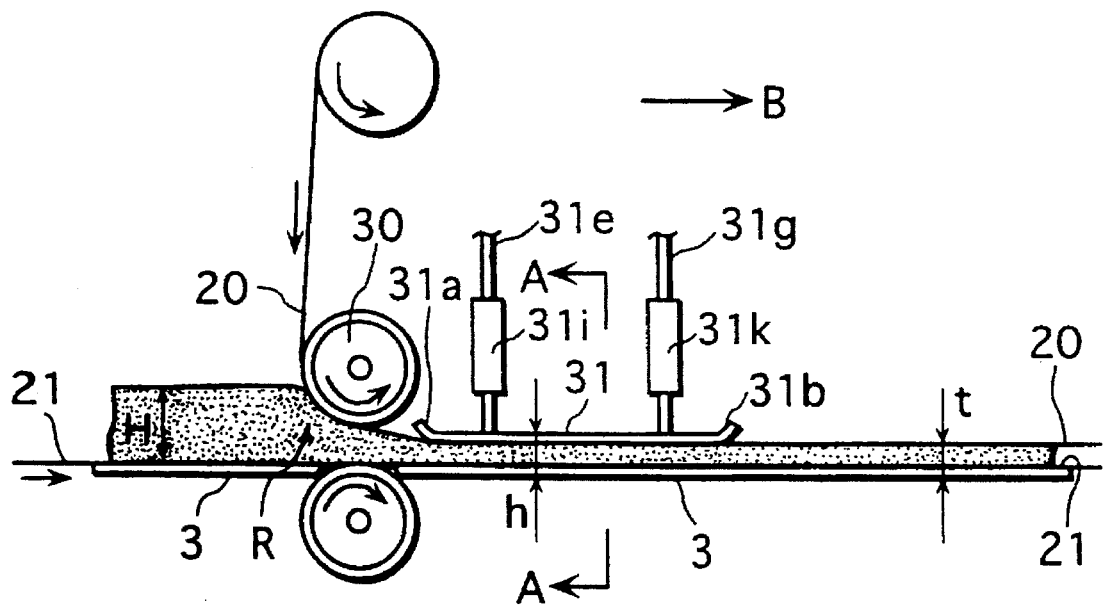
FIG. 2 is an enlarged view illustrating essential parts around a regulating plate.

Referring to FIGS. 1 and 2, in a continuously forming method according to this embodiment, a resin compound is filled between two upper and lower belt-like films 20, 21 which run horizontally in two layers disposed one over another, on a band-like floor 3, upstream of packing rolls 30 so as to continuously form a synthetic stone. That is, a regulating plate 31 for restraining the flow of the resin compound is disposed horizontally above the band-like floor 3, downstream of the packing rolls 30, and while the gap between the regulating plate 31 and the band-like floor 3 is maintained at a predetermined distance, the resin compound is continuously filled, and the level H of the compound resin corresponding to the filling volume thereof is adjusted in accordance with a variation in the plate thickness of the mold resin plate passed under the regulating plate 31.

At first, explanation will be made of a continuously forming apparatus.

A lower film 21 is paid off from a film roll 1 in which a film is wound in a roll-like shape, by means of a lower film pay-off machine 2, and films 21 passes through a curing oven 4 while it slides on the band-like floor 3 and then wound up by a wind-up machine 8.

Meanwhile, an upper film 20 is paid off from a film roll 9 in which the film is wound in a roll-like shape, by means of an upper film pay-off machine 10, and the thus paid-off upper film 20 is fed in the direction of the arrow B by packing rolls 30 (which will be hereinafter referred to "first rolls"). Further, the upper film 20 travels through the curing oven 4 while it runs in parallel with the lower film 21 on the band-like floor 3, and is wound up by a winding machine 8.

The above-mentioned upper and lower films 20, 21 are respectively tensed so as to remove shrinkage therefrom.

Figure 3:
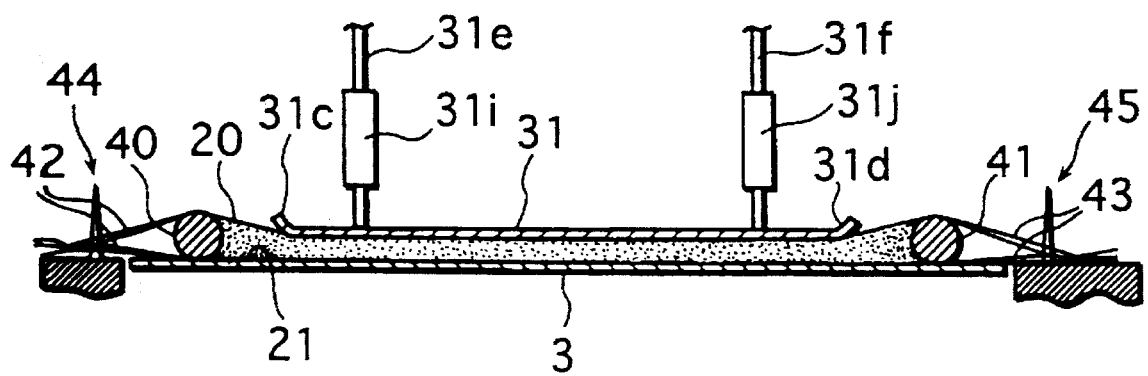
FIG. 3 is a sectional area as viewed along the A—A arrow line in FIG. 2.

Referring to FIG. 3, stationary spacers 40, 41 are fixed at opposite ends thereof to fixing devices (which are not shown) provided upstream and downstream of the band-like floor 3, respectively, and accordingly, the tensions of the tensed spacers 40, 41 can be adjusted by the fixing devices.

Belt-like film rollers (which are not shown) for feeding a belt-like film with which the barrels of the spacers 40, 41 are covered, are disposed in parallel with each other, upstream of the first roller 30, and belt-like films paid off by these belt-like film rollers are folded in a crosswise U-like shape after passing through edge folders (which are not shown), and are then fed to the spacers 40, 41. The belt-like films with which the spacers 40, 41 are covered, will be hereinafter referred to lateral films 42, 43, respectively.

Further, the widthwise edge parts of the upper film 20, the lower film 21 and the lateral film 42 on one side are fixed by being stuck to pin tenters 44 in their tensed conditions. Further, the widthwise edge parts of the upper film 20, the lower film 21 and the lateral film 43 on the other side are also fixed by being stuck to a pin tenter 45.

The above-mentioned pin tenters 44, 45 are arranged to be circulated along opposite edges of the band-like floor 3, and accordingly, the widthwise edge parts of the upper film 20, the lower film 21 and the lateral film 42 on one side, are slid over the outer surface of the spacer 40 as a guide, and the widthwise edge parts of the upper film 20, the lower film 21 and the lateral film 43 on the other side, are slid over the outer surface of the spaces 41 as a guide while they are integrally slid on the band-like floor 3.

The pin tenters 44, 45 may be coupled to a motor so as to be circulated along both edges of the band-like plate 3. In this cage, instead of the wind-up machine 8, the pin tenters 44, 45 directly tow the upper and lower films 20, 21 while they directly (the lateral films are fixed to the pins) or indirectly (the lateral films are fixed to the upper or lower film) tow the lateral films 42, 43.

Referring to FIGS. 2 and 3, the regulating plate 31 is formed of a rectangular metal plate, having its all sides which are curvature so as to form upward warped parts 31a, 31b, 31c, 31d for smoothly passing the upper film 20. Further, the regulating plate 31 is supported by four support rods 31e, 31f, 31g, 31h. These support rods incorporate adjusting parts 31i, 31j, 31k, 31l, respectively, and accordingly, the gap h between the regulating plate 31 and the band-like plate 3 can be set to a predetermined distance by adjusting the adjusting parts 31i, 31j, 31k, 31l. Further, the height at which the regulating plate 31 1s disposed, has to be set to be equal to or lower than the height of the spacers 40, 41, and further, as shown in FIG. 3, the widthwise length of the regulating plate 31 is set to be shorter than the distance between the spacers 40, 41.

With the above-mentioned arrangement, the filling volume of the resin compound is controlled so as to set the level H of the resin compound in a predetermined range, and accordingly, variation in the pressure of the molding material in the inlet side of the regulating plate 31 can fall within a predetermined range. In addition to the above-mentioned control of the level of the resin compound, the control of changing the desired value (set value) for the level of the resin compound to be controlled in accordance with a thickness of a mold product is preferably carried out in order to prevent the thickness from varying due to variation in the viscosity of the molding material or the like. Specifically, a thickness sensor is used to periodically detect the molding thickness t of the resin plate, and the thus detected results are successively compared with a desired set thickness. If they exhibit a tendency exceeding the desired set thickness, the control of changing the desired value is carried out so as to lower the level H of the resin compound. Meanwhile, if they exhibit a tendency lowering below the desired set thickness, the control of changing the desired value is carried out so as to raise the level H of the resin compound. By performing the above-mentioned feed-back control with the use of a microcomputer, the desired value for the level of the resin compound can be changed.

It is noted that a vinylon film is used for the films in this embodiment since the vinylon film is tough, and has a flat and smooth surface, and prevents electrification, further having its surface which is hard to be damaged. Additionally, the vinylon film is preferable in view of such a point that it shrinks under the application of heat so as to eliminate wrinkles possibly occurring in the film. Besides the above-mentioned film, a film such as nylon, tetron, polypropyrene, polyethylene or the like can be used.

Embodiment 1

Explanation will be hereinafter made of specific embodiments.

100 parts of acrylic syrup, 160 parts of aluminum hydroxide and the like were mixed in a mixing and defoaming vessel. Then, 260 parts of the thus obtained resin compound and 0.5 parts of a hardener were mixed together by a mixing filler. The resin compound was poured over the upper surface of the lower film 21 running on the band-like floor 3. In case of a synthetic stone having a thickness of 13.5 mm, the height h of the regulating plate 31 disposed in rear of the first rollers 30 was set to 12.5 mm, and the feed volume of the resin compound from the mixing filler was maintained constant in order to hold the level H of the resin compound obtained just before the first rollers 30, at 17 mm.

While monitoring the molding thickness detected by the thickness sensor located at a rear position in the flowing direction, the bank height H and the filling volume were controlled. The upper and lower surfaces of the resin compound were held between the upper and lower belt-like films 20, 21, and the stationary spacers 40, 41 were arranged on opposite sides thereof. Further, the inner barrel surfaces of the spacers 40, 41 were covered with the lateral films 42, 43 which were folded in a crosswise U-like shape by the end folder, and which are moved in the direction of the arrow B together with the upper and lower films 20, 21. At this time, wrinkles remaining on the upper film 20 were eliminated by being stretched by the pin tenters 44, 45, and wrinkles remaining on the lower film 21 were eliminated by being stretched by the pin tenters and by being heated during passing of a curing oven 4 which will be described later.

Next, the resin compound (R) surrounded by the upper and lower films 20, 21 and the lateral films 42, 43 was moved on the band-like floor 3 which was held at a temperature of 40° C., and then, it led through the above-mentioned curing oven 4 having its internal temperature set to 60° C. Further, the travelling speed of the films (resin compound) was set to 20 cm/min.

At this time, the range of variation in the level of the resin compound was ±1 mm. Since the dimensional accuracy required for the molded product was ±0.2 mm, the required function of the regulating plate becomes 5 from the above-mentioned expression (1). The viscosity of the resin compound was 50 poise, and the gap by the regulating plate was 12.5 mm. If the regulating plate was used for a length of 300 mm, the following result was obtained:

$$K=\{(300mm/12.5mm)\times 50(poise)\}/5=240.$$

The accuracy of the thus obtained product was 13.5 mm±0.2mm. On the contrary, if the regulating plate having a length of 50 mm was used, the following result was obtained:

$K=\{(50 \text{ mm}/12.5\text{mm})\times 50(\text{poise})\}/5=40.$

The accuracy of the thus obtained product was lowered to 13.5 mm±0.6 mm. However, since the accuracy of a product which was produced with no use of the regulating plate was 14.3±1 mm, it was found that the accuracy of the plate thickness could be enhanced up to one-tenth of 1 mm.

It is noted that the spacers in this embodiment, have to be formed of members having a low frictional coefficient, and accordingly, they may be formed of a teflon tube, a teflon solid rod, or a metal pipe, a solid rod or the like which is coated with resin having a low frictional coefficient. Further, the sectional shape of the spacers should be limited to not only a circular shape but also an elliptical shape, that is, a pipe or a solid rod having an elliptic cross-sectional shape may be used.

The continuously forming method for a synthetic stone, according to the present invention can be applied for continuously forming a resin plate having an arbitrary wall thickness.

As clearly understood from the explanation as mentioned above, with the use of the method of continuously forming a synthetic stone, according to the present invention, a stone having a thickness with a high degree of accuracy can be formed.

Embodiment 2

100 parts of unsaturated polyester resin (N-325 made by Nippon Shokubai Co., Ltd.), 100 parts of calcium carbonate (NS#100 made by Nitto Flouting Industrial Co., Ltd.), 5 part of white color toner (AT-3 made by Dainichi Seika Co., Ltd., and 3 parts of glass monofilament having a length of 1.5 mm (CS2E580S made by Nitto Boseki Co., Ltd.) were mixed and thereafter defoamed foamed in the mixing and defoaming vessel. 208 parts of the thus obtained resin compound and 0.5 parts of a hardener (Perbutyl 0 made by Nippon Oil and Fat Co., Ltd.) were mixed together, and were then defoamed. The resin compound was used for forming a synthetic stone in a method similar to that in the above-mentioned embodiment 1, and the following results were obtained by measurements:

| | |
|---|---|
| Thickness of formed resin plate (t) | 12.1 mm |
| Height of regulating plate | 11.9 mm |
| Level of resin compound | 15.0 mm |
| Range of variation in H | 1.0 mm |
| Required dimensional accuracy | 0.2 mm |
| Viscosity of resin compound | 100 poise |

In case of using a resin plate having a thickness of 300 mm, the following result was obtained:

$K=\{(300 \text{ mm}/11.9 \text{ mm})\times 100 \text{ poise}\}/5=504$ 0.2 mm, and the product had a white transparent outer surface.

Japanese Application HEI 6-123890 filed on Jun. 6, 1994 is herein incorporated by reference.

What is claimed is:

1. In a method for continuously forming a synthetic stone, comprising the steps of:

filling a resin compound between two belt-like upper and lower films running horizontally in two layers; and thereafter hardening the resin compound;

the improvement wherein after the resin compound is filled between the film in two layers, the resin compound is passed through a pair of rollers guiding the belt-like films whereby the thickness of the resin compound is regulated; and after passing through the rollers, the resin compound is passed through a rigid regulating plate disposed downstream of the rollers whereby pressure variation in the resin compound being fed is suppressed and the resin compound is formed into a plate-like shape, having a constant thickness, and wherein the lower film slides on a band-like floor, and wherein said regulating plate is supported by support rods that have adjusting members incorporated therein, and wherein the adjusting members are adjustable in order to maintain or adjust a gap between said regulating plate and said band-like floor.

2. A method for continuously forming a synthetic stone, as set forth in claim 1, wherein a level of the filled resin compound is detected, for adjusting the filling volume of the resin compound so as to maintain the thus detected level of the resin compound at a desired value.

3. A method for continuously forming a synthetic stone, as set forth in claim 1, wherein a level of the filled resin compound is detected, for adjusting the filling volume of the resin compound so as to maintain the thus detected level of the resin compound at a desired value, and a thickness of the resin compound passed through said regulating plate is detected, for correcting said desired value in accordance with a difference between the thus detected thickness and a desired forming thickness.

* * * * *